United States Patent [19]
Debrie et al.

[11] 4,056,763
[45] Nov. 1, 1977

[54] DEVICE FOR CONTROLLING A MECHANICAL ELEMENT WITH EFFORT RETURN

[75] Inventors: Guy Debrie, Massy; Claude Grenier, Orsay; Michel Petit, La Celle St-Cloud; Henri Rigaut, Limours; Jean Vertut, Issy-les-Moulineaux, all of France

[73] Assignee: Commissariat a l'Energie Atomique, Paris, France

[21] Appl. No.: 586,229

[22] Filed: June 12, 1975

[30] Foreign Application Priority Data
June 19, 1974 France .................. 74.21355

[51] Int. Cl.² ............................. G05B 11/14
[52] U.S. Cl. .................... 318/675; 318/85; 318/628
[58] Field of Search .......... 318/85, 628, 616, 675

[56] References Cited
U.S. PATENT DOCUMENTS

| 2,689,318 | 9/1954 | Goertz et al. | 318/628 |
| 3,549,948 | 12/1970 | Jaeschke | 318/85 |
| 3,896,361 | 7/1975 | Inaba et al. | 318/616 |
| 3,906,313 | 9/1975 | Davis | 318/85 |

Primary Examiner—B. Dobeck
Attorney, Agent, or Firm—McNenny, Pearne, Gordon, Gail, Dickinson & Schiller

[57] ABSTRACT

A reversible mechanical unit of the "slave" type comprising a motor element and position detector is controlled by an assembly which delivers command signals relating to the positions of the motor element. Means are provided for delivering an error signal ε which is proportional to the difference between the signals delivered respectively by the detector and the control assembly. A signal delivered by a generator and having an amplitude which is proportional to the signal ε produces direct action on the torque of the motor element; the error signal and the torque are thus in one-to-one correspondence, the error signal being fed back into the control assembly.

12 Claims, 3 Drawing Figures

DEVICE FOR CONTROLLING A MECHANICAL ELEMENT WITH EFFORT RETURN

This invention relates to a device for controlling a mechanical element with effort return.

In devices of this type, correspondence control systems permit remote trasmission and reception of mechanical data which are conventionally transmitted in positive and reversible mechanical transmission systems, that is to say the continuous control of a position and of an effort which is associated with the maintenance of said position.

Means for carrying out remote transmission operations are already known and employed in particular in the construction of the so-called "master-slave" remote manipulators with effort return in which the systems for correspondence control by electronic, electrical and/or hydraulic means satisfy the conditions which have just been set forth. These control systems usually make use of position detectors placed on the control elements and the corresponding controlled elements which are referred-to in this case as the master element and the slave element. As a general rule, the position detectors aforesaid are potentiometers, selsyns or absolute digital encoders. Similarly, the master element and the slave element are equipped with motors and the position error signal obtained by establishing a difference between the signals produced by the slave and master position detectors actuates said motors simultaneously by means of suitable control loop circuits. In consequence, any controlled movement applied to the master arm is accompanied by the same movement at the slave end while the master motor restitutes a resistance which is equal to, or a one-to-one function of, the resistance encountered by the slave element. As a further consequence, if said slave element is caused to carry out a movement, this accordingly results in the reproduction of said movement at the master end with the same effort, thus permitting of totally reversible control.

The operation of these systems is based on the association of elements for detecting master and slave positions whose difference produces a relative-position error signal which controls suitable control-loop circuits which in turn control in a similar manner the motors located at the master end and at the slave end. In consequence, the value of torque resulting at the slave end from an effort applied at the master end (and conversely) is substantially proportional either statically or dynamically to the relative difference in position derived from the position detectors mentioned earlier. The result thereby achieved is that the effort return device is representative of the torque in the rotor of the motor and is accordingly subject to errors arising from friction forces in said motor, from the friction set up in transmission and also from the inertia forces which can be present in the master and slave elements.

Remote manipulators are also known in which the master element simulates the mechanical elements. This dataprocessing unit receives the instructions relating to position and effort given by an operator or relating to an automatic control program and the like, and transmits the necessary information to the slave element. As a general rule, these assemblies are irreversible and any positional error of the slave mechanism is liable to result in uncontrolled efforts in a rigid environment and in any case do not permit the efforts derived from this medium to produce any automatic reaction on the slave element.

The aim of the invention is to overcome these disadvantages and especially to endow the effort return with maximum sensitivity without thereby entailing a risk of instability or any other defect in the correspondence control operation, whether the master element is a mechanical control element or a unit for processing and/or programming information.

The device which serves to control a mechanical assembly of the so-called "slave" type in displacements and in efforts and is actuated by a motor element is distinguished by the fact that said mechanical assembly is reversible and comprises a position detector for delivering a signal which is proportional to the displacements of said assembly and that said device comprises an assembly for controlling said motor element and delivering a signal constituting orders relating to the positions of said motor element, means for producing an error signal $\epsilon$ which is proportional to the difference between the signal delivered by the detector and the signal delivered by said control assembly, a generator for delivering a physical signal which produces action directly on the torque of the motor element, the amplitude of said signal being proportional to the signal $\epsilon$, the relation between the error signal and the torque being thus in one-to-one correspondence, the error signal being also fed back into said control assembly.

In a first embodiment, the control assembly is constituted by a second mechanical assembly actuated by a second motor element comprising a second position detector, each motor element is controlled independently by a control loop circuit, each loop circuit being provided with means for generating an error signal $\epsilon$ which is proportional to the difference between the signals emitted by said transducers, means for deriving said error signal $\epsilon$ so as to give a signal $\epsilon'$ which is proportional to said derivative, means for determining the difference between the signals $\epsilon$ and $\epsilon'$ so as to give the signal E, and a second correspondence control stage constituted by a generator for delivering a physical signal which produces action directly on the torque of the motor element, the amplitude of said signal being proportional to the signal E, the relation between the error signal and the torque being thus in one-to-one correspondence.

In accordance with a further characteristic feature, each loop circuit comprises means for deriving the signal delivered by the transducer of the loop circuit considered and for adding said derived signal to the signal E at the input of said generator.

In accordance with a third characteristic feature, each control loop circuit comprises means for producing the second derivative of the signal emitted by the transducer which is associated with said loop circuit and for adding said derivative to the signal which already drives the generator.

In accordance with a fourth characteristic feature, at least one loop circuit comprises means for deriving the signal emitted by the transducer which is associated with said loop circuit, means for comparing said derived signal with a threshold value, means for producing a constant control signal and adding said signal to the signal which already drives said generator if said threshold value is attained, said control signal being such as to correspond to the starting torque of the motor element.

In an alternative embodiment, each loop circuit comprises a torque transducer for emitting a signal which is proportional to the torque really applied to said module and means for deducting said signal from the control signal of said generator.

In accordance with a second embodiment, the control assembly is constituted by a unit for processing and/or programming position and effort information.

A more complete understanding of the invention will in any case be gained from the following description of a number of embodiments of the invention which are given by way of example without any limitation being implied, reference being made to the accompanying figures, in which.

Figure 1:
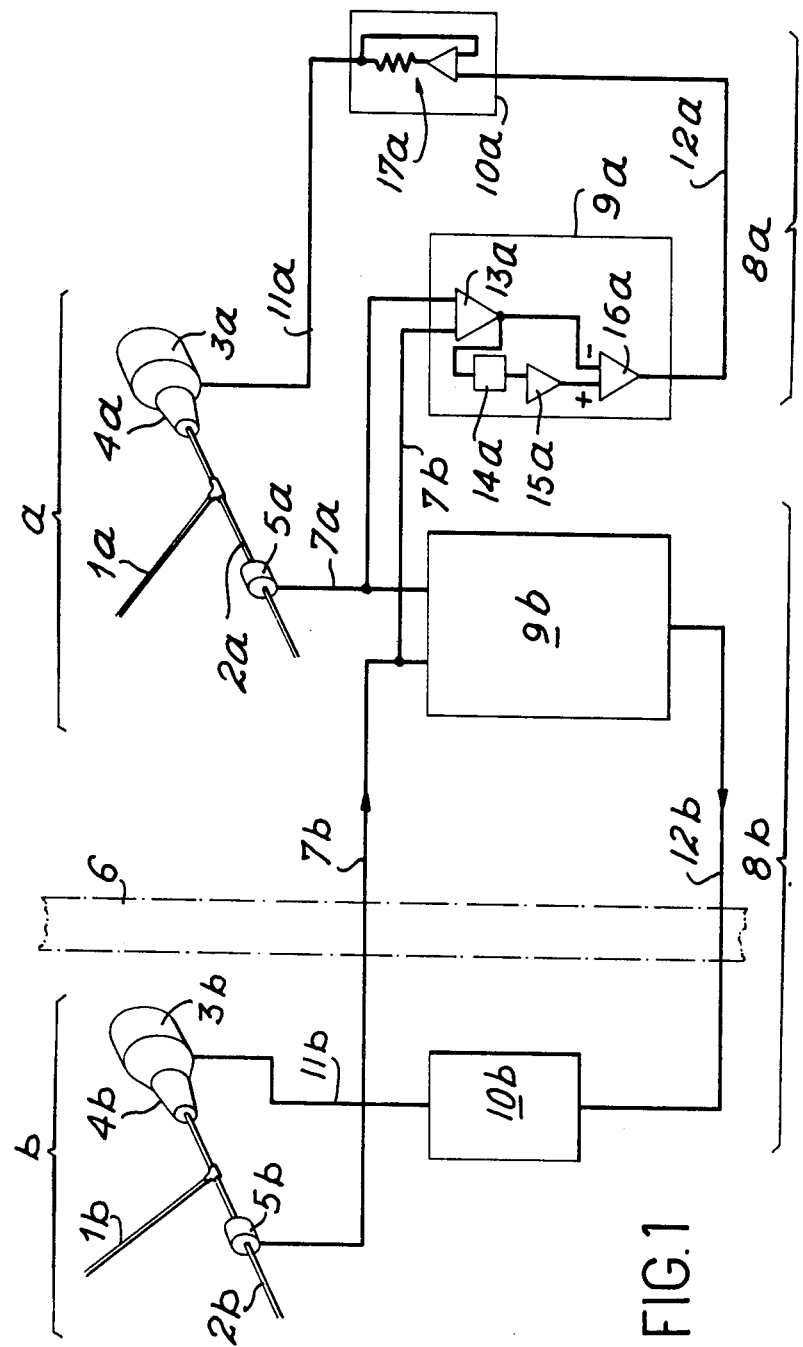
FIG. 1 is a simplified form of construction of the correspondence control circuit.

There can be seen in FIG. 1 a remote transmission assembly with effort return in accordance with the invention and comprising a master assembly $a$ located at a distance from a slave assembly $b$. The components of each assembly are designated respectively by the indices $a$ or $b$ and consist of a master control lever $1a$ pivotally mounted on a shaft $2a$ actuated by an electric torque motor $3a$ which drives a position detector $5a$ by means of a set of pinions $4a$ which is rigidly fixed to the lever $1a$. The same elements designated by the indices $b$ are found at the slave end. The master assembly and the slave assembly are separated by a barrier 6 which can be either distance or a separation between media, the medium $b$ being in principle deleterious with respect to the medium $a$. The correspondence control assembly in accordance with the invention therefore comprises transmissions $7a$ and $7b$ which return the data from the master and slave position transducers to two independent correspondence-control amplifying assemblies which may or may not be identical and control respectively the motors $3a$ and $3b$ by means of power connections $11a$ and $11b$. In accordance with the invention, each correspondence control assembly is designed in two portions $9a$, $10a$, $9b$ $10b$.

As shown in FIG. 1, the stages $10a$ and $10b$ are placed as close as possible to the torque motors. To this end, the amplifier $10b$ could be placed in the deleterious medium. The signals derived from the portions $9a$ and $9b$ and transmitted by the connections $12a$ and $12b$ are signals for controlling the power amplifier and a connection $12b$ which passes through the barrier 6 will therefore control from the master space the power amplifier $10b$ which is located on the slave side. It will therefore be noted that the assembly requires a slave-to-master return connection $7b$ and a masterto-slave connection $12b$; it will similarly be noted that the preamplifier assembly $9b$ has been placed on the master side for reasons of safety although this arrangement is clearly not essential.

It is apparent that the arrangement of the two assemblies is symmetrical apart from the geographical arrangement of the different elements.

Consideration will now be given to the operation of the various elements such as the preamplifiers $9a$, $9b$ and the power amplifiers $10a$ and $10b$. At the inputs of the preamplifiers of the type designated by the reference 9, there is formed the algebraic sum of the signals derived from the absolute position detectors 5. It may be noted in this connection that, if these assemblies are disposed in the manner shown in the figure and the position transducers 5 are placed in the same direction, it will be necessary to determine their difference. On the other hand, if they have been placed in opposite directions of rotation, their algebraic sum will accordingly be zero when the master and slave modular elements are located in the same position. The preamplifiers 9 have a structure which is already known in the field of correspondence control but a description of these latter is nevertheless necessary for the sake of enhanced clarity. Within the preamplifier $9a$, the position error signal is passed into a first amplifying stage $13a$. Moreover, a differentiating circuit $14a$ gives the derivative of the error signal, that is to say a value proportional to the difference in velocity between the master assembly and the slave assembly. A second amplifier $15a$ amplifies said derivative and a final output amplifier $16a$ establishes the algebraic difference between these two values which is recognized as a conventional control element based on position and velocity; however, a study of the double correspondence control under consideration demonstrates the fact that, in contrast to the conventional position control which consists in processing a position signal and a velocity signal, only a differential velocity signal is necessary in this instance. This traditional position control element processed by means of a stage $9a$ comprises a stabilization network if necessary and the output signal drives the power amplifier $10a$ by means of the connection $12a$.

In this known position, it can be readily understood by postulating static conditions that, if the element $1b$ is subjected to an effort which results in a very small displacement, the error signal which controls the amplifier $13a$ is without response in the derived channel inasmuch as the velocity is zero. Since the effort is static, a signal which is proportional to the displacement of the slave unit $1b$ is delivered at the output of the loop circuit $9a$. The amplifier $10a$ converts this value into a voltage which is applied to the motor $3a$ and it can be understood that, since all these amplifiers are linear, the effort applied at $1a$ is therefore proportional to the initial position difference. On the other hand, if a displacement takes place without any resisting force at the slave end and if the amplifier $10a$ is a voltage amplifier, it is apparent that the back e.m.f. of the motor $3a$ will produce a viscous damping action and that the master unit will consequently be subjected to a resistance which is proportional to the velocity; the same will apply if said displacement is intended to overcome in addition a resisting force at the slave end which is added to the preceding resisting force at the master end.

The secondary power control loop circuit $10a$ in accordance with the invention overcomes the disadvantage mentioned above. In this first embodiment of the invention, said circuit consists of a current amplifier and the resistor $17a$ at the output of said amplifier serves to measure the output current which passes through the line $11a$ towards the motor $3a$ and to control the output current in dependence on a value which is proportional to the voltage derived from the preamplifier stage and the stabilizer $9a$.

Said assembly therefore behaves as a current generator (in the particular case of electrical signals) for delivering a current whose amplitude is proportional to that of the control signal which drives said assembly.

Under these conditions and irrespective of the value of back e.m.f., the output current of the amplifier $10a$ will correspond to the necessary value of torque which has previously been "calculated" in the stage $9a$.

It is apparent that the first elements which are contained in the stage 9a and have the allotted functions of position control and stabilization by means of the differential velocity are completed by the current control elements and these latter are grouped together within the second power stage 10a which controls the value of torque in the rotor of the motor 3a.

It is further apparent that the arm corresponding to the slave unit comprises similar elements to which are assigned the index b. It would be possible in another form of the invention to have a difference between the two amplification lines 8a and 8b as distinguished in particular by the fact that the response of the last stage 10a would be proportional and not equal to that of the stage 10b, thus resulting in an effort return which is proportional to the effort applied on the slave side. In accordance with another preferred feature of the invention, this response can be logarithmic, thus making it possible to produce a continuous variation in the effort return on the master side from a ratio of 1 (or more) in the case of efforts of very low magnitude to a lower value which results in a multiplication of the effort transmitted, thus minimizing fatigue of the operator in the use of this correspondence control system.

It is also worthy of note that, if the modules a and b are identical, the element 9a considered can be strictly identical with the element 9b and these two elements can in that case be combined to form a single unit. This would not apply if the inherent characteristics of the motor and of other portions of the slave arm were to entail the need for different amplification or stabilization terms, a stage 9b which is different and independent from the stage 9a being accordingly necessary in such a case.

It can readily be understood that the device shown in this example has the effect of correcting in a simple manner the "viscous" friction of the torque motor which is employed in this case while permitting successful modular chopping. It is easy to conceive a similar arrangement applied to another type of motor of either the alternating-current type or the pulsed-current type or finally by utilizing the action of servo-valves on hydraulic motors by pressure control.

It nevertheless holds true that the correspondence control system as illustrated recopies on the master side from the slave side torques which are applied at the level of the armature current of the torque motor, that is to say before the inherent friction of said motor at the level of the commutator, the friction set up in the gear cluster 4b, any friction resulting from pivotal motion about the shaft 2b and so forth, and the same applies to the master side a. In other words, said loop circuit restitutes static and dynamic forces while taking into account the friction of the two motors and the dry transmission friction, there being left in return the viscous friction forces which are liable to appear in the mechanism and especially the inertia which is inherent in the motors themselves and in the master and slave modules.

In fact, when an acceleration is applied to the master lever 1a, it is necessary to overcome the inertia proper of the entire master modulus, namely that of the lever itself and that of the motor which are rigidly coupled to the assembly by means of the pinions 4a. It will become apparent that the equivalent of the inertia forces of the slave assembly is received in addition on the master side. In fact, in order to overcome the inertia forces on the slave side and to obtain a desired value of acceleration, there will be produced a relative displacement, a position error signal such that a sufficiently high current is established within the slave motor. As has been seen in the foregoing, an equal or proportional current will be established in the master motor, thus adding to the inherent inertia of this latter the reflected inertia of the slave motor.

The different alternative embodiments of the invention which will be presented in the following figures assume one by one the different points which have just been mentioned in regard to viscous friction and inertia, dry friction and so forth.

Figure 2:
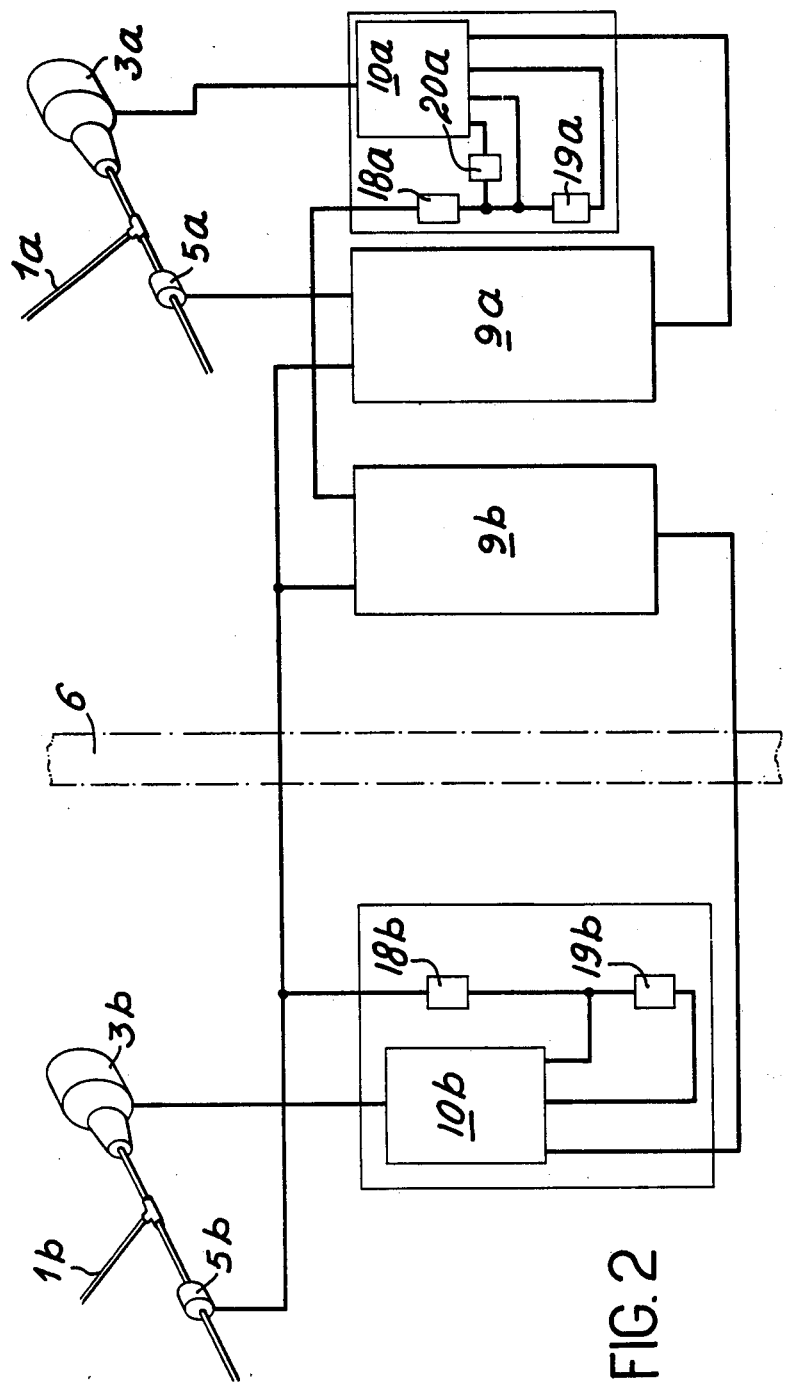
FIG. 2 is a more elaborate form of construction of said circuit.

There is shown in FIG. 2 an alternative embodiment of the invention comprising a viscous friction corrective. There are again shown in this figure the elements which were already illustrated in FIG. 1, namely the two stages 9a and 10a respectively for position control and torque control of the motor 3a and the corresponding slave elements 9b and 10b which are represented without any detail. This case corresponds to the possibility of corrections of a viscous friction other than that caused by the back e.m.f. of the motor, in which the correction is performed by the actual structure of the control stage 10a. In fact, a generally low value of friction is introduced by the mechanisms and the motors employed and is proportional to the speed which could assume a high value if the slave element 1b were located in water, for example, and if it is desired to restore to the master element 1a elements of effort which are freed from the resistance of the water. Under these conditions, this form of the invention is characterized by the use of a second differentiating circuit 18b on the slave arm. After amplification, said circuit produces a signal which is proportional to the velocity of the slave assembly and adds to the input of the current amplifier 10b the voltage corresponding to the resistance which is proportional to the velocity (or viscous friction resistance). There has been shown in this figure the differentiating circuit 18b which is wholly independent of the position control assembly 9b but it can be simple in practice to group it together with the elements of this latter. The result achieved by said viscous friction corrector 18b is the same as if said viscous friction had been removed from the effort return on the master side in which no additional current signal is transmitted to the motor 3a in respect of the same error signal.

It may also happen that a few viscous friction forces may exist at the master end and that it is necessary to overcome these latter in the same manner as at the slave end in order that the slave-end effort to which the lever 1a is subjected is more representative of the real torque required than is the case with the current delivered to the torque motor 3a. In this case, a similar element 18a for correcting viscous friction will be also applied at the master end.

It is apparent that if the motors are identical in the case of total symmetry of the chain, the elements 9a and 9b are identical and that the elements 18a and 18b have every chance of being also identical insofar as the viscous friction forces which are foreign to the motors are also symmetrical both at the master end and at the slave end. In this case, it is possible to verify the initial statement to the effect that only one term of differential velocity is necessary in the construction of two-way control systems of this type. There is a tendency in such systems to maintain general symmetry but to transmit to the master end only proportional and not equal efforts, thus resulting in relatively different mechanical solutions on the master side and on the slave side; duplication of the circuits 9a and 9b and the need for at least one viscous friction corrector 18b accordingly proves necessary.

In consequence, we now have a system in which the error signal between the master assembly and the slave assembly is representative of efforts exerted without viscous friction. It has been seen that a system of this type, although improved with respect to the previous system, continues to produce a reaction arising from inertia of the slave elements on the master element, this reaction being added to the inherent inertia of said assembly. In consequence, there has also been added in FIG. 2 a second alternative and independent embodiment of the same invention which comprises an inertia-correcting device. There has therefore been placed at the output of the differentiating circuit 18b on the slave side a second differentiating circuit which gives the second derivative and, after simplification, said system produces at the input of the current amplifier 10b a voltage which is proportional to the accelerator of the system at the given instant; accordingly, the resultant complementary torque exerted at the shaft of the motor 3b is capable of overcoming the inertia encountered at the time of said acceleration but a corresponding increase in the position error signal need not necessarily assume said value; in this arrangement, the master motor consequently receives the currents obtained from said position error signal and possibly from its first derivative which corrects the viscous friction and the result thereby achieved is the same as if the inertia of the slave assembly has been removed from the master return. In the same manner as before, it is readily apparent that a similar circuit 19a in series which gives the second derivative can also serve on the master side to correct the inherent terms of inertia of this latter. Similarly, it will be repeated that, for the sake of convenience of the description, these successive differentiating circuits have been placed outside the position control element 9a or 9b but that these assemblies can be grouped together in practice.

It can be understood that, by suitable adjustment of the output gains of the first and second differentiating circuits, it is possible to reduce almost entirely the effect of the viscous friction and of the inertia on the effort return at the time of operation of this correspondence control system and this applies both in one direction and in the other. There then remains the dry friction which exists at the actual level of the torque motors employed but also and especially at the level of the reduction gears which are necessarily interposed between said motors and the output elements of the correspondence control modules.

In this instance, the friction mentioned above can be considered as constant and close to the torque which is necessary for the starting operation.

There has also been shown in FIG. 2 another alternative embodiment of the invention comprising at the output of the differentiating circuit 18a a threshold circuit 20a which, as soon as it detects a velocity, that is to say a displacement defined by its direction, transmits in this instance a constant voltage having a value close to, lower than or equal to that which produces the necessary current within the motors 3a and 3b by means of current amplifiers 10a and 10b so as to provide the real starting torque which is necessary for both modules. As stated earlier, the above-mentioned dry friction corrector can also be introduced into the slave circuit in the form of a logic circuit for initiating the application of the suitable constant voltage on the master side.

It is therefore seen in conclusion that, by means of the correctors which are proportional to the velocity and acceleration and the displacement threshold detector which have just been described in the foregoing, it is possible with the aid of practical adjustments to effect the reconstitution by analog computation of the terms which enable the input of the current amplifier 10b to make the necessary corrections for ensuring that the signal delivered by the stage 9b produces the necessary torque at the motor shaft to obtain the desired value of torque at the end of the slave module 1b and also at the end of the master module.

It is apparent that these different terms and the structure as explained above are wholly suited to practical requirements and thus permit a considerable improvement in the performances of an apparatus, especially a remote manipulator of the so-called master-slave type which utilizes the improved loop circuit in accordance with the invention.

As can be expected for practical reasons, it will remain an advantage to place the correctors 18, 19, 20 of the slave system on the master side as is also the case with the element 9b with a view to facilitating access in the event of remedial work or repair. This is not in any way liable to impair the symmetry of arrangement of the system. The assembly which consists of the current amplifier 10 together with the correctors 18, 19, 20 and constitutes the second stage in accordance with the invention has the design function of controlling the motor in dependence on the torque applied at the output of the master module or of the slave module, said torque being accordingly proportional or in any case a one-to-one function of the position error signal delivered by the position detectors 5a and 5b.

The characteristic feature of the invention has thus clearly been respected insofar as the correspondence control element is constructed in two portions, namely a position control portion 9 connected in series to an element 1 for the output torque control of the module considered.

In regard to the dry friction corrector, it will be observed that in the arrangement shown in FIG. 2, said corrector will in fact induce the friction-correcting current only after the effect of a movement of even the smallest magnitude. In consequence, this system will provide satisfactory performance if there exists between the position transducer 5b and its motor 3b a very small clearance or rather a very small degree of flexibility, which in fact plays the part of an all-or-none effort detector. Should this not be the case, the system will really assist the movement of the operator only after start-up and to this extent will not be fully effective. Moreover, the manual action of this corrective leaves a certain amount of friction and would result in instability of the entire system if this were not the case.

Figure 3:
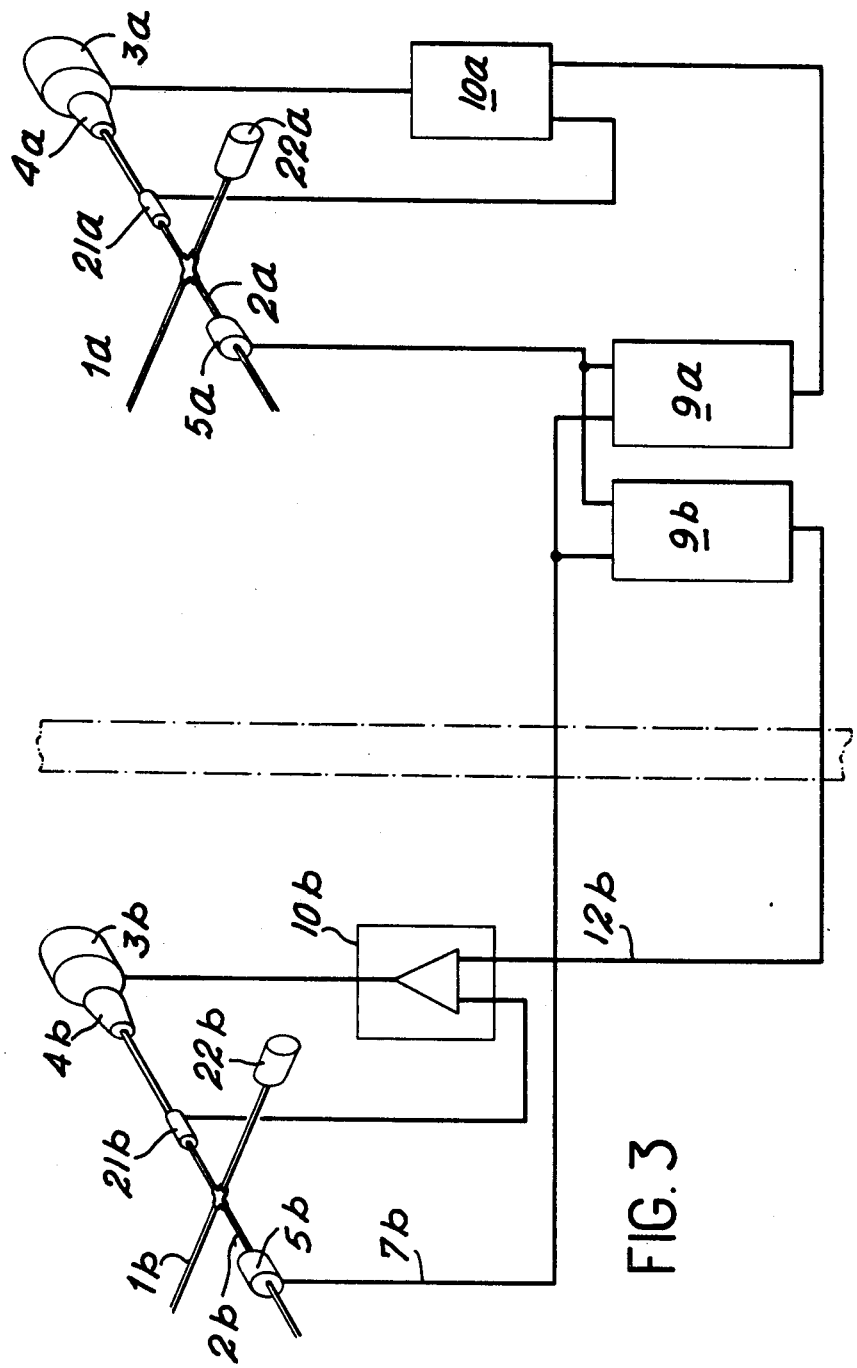
FIG. 3 is a form of construction of the circuit in which provision is made for a torque detector.

It is in order to overcome the disadvantage just mentioned that a third alternative embodiment of the invention shown in FIG. 3 makes use of an effort detector on each master and slave module, thus permitting a very high degree of sensitivity to the effort applied.

FIG. 3 in fact shows an assembly in accordance with the invention which is similar to those illustrated thus far together with a master modular assembly a to which corresponds the modular slave assembly b; the slave position transducer 5b returns via the connection 7b the data which are compared in the two similar correspondence control and stabilization stages 9a and 9b, the output signal of which controls the torque of the upper stage. In this alternative embodiment of the invention, said upper stage is always designated by the references 10a and 10b. However, there have been added to the output of the reduction-gear units 4a, 4b torque detectors 21a and 21b, the signals delivered by these latter being suitably amplified and compared with the control reference value of the current amplifiers 10a and 10b; it is thus apparent that, when the output signal of the stage 9b imposes a very low value of torque derived from a very weak position error signal, the action of a current will be initiated within the motor 3b until the torque which is in fact applied to the torque detector 21b over and above the friction forces, inertial forces and play of the assembly 3b, 4b corresponds to the intended effort and the same operation is carried out on the master side.

There is also shown in this figure the counterweight 22a and 22b which has the effect of balancing the mass of the lever 1 about the pivotal shaft 2. Indeed, the effect of this system is to make the effort detected by the torque detectors 21 equal to the effort which is in fact applied to the extremity of the lever, namely of the master or slave module. The counterweight can be clearly employed in the previous embodiments.

It is readily understood that the device shown in this figure carries out at the same time all the corrections for dry friction, viscous friction and inertia of the elements located upstream of said detector, namely on the motor side while permitting return transmission by the loop circuit of the dry-friction and viscous-friction inertia forces corresponding to the "downstream" portions, that is to say the transmission proper, the lever and its inertia and so forth which can in any case be subjected to corrections related to the first or second differentiation of the absolute position signal derived from the transducer 5.

The advantage of the device shown in FIG. 3 in this final alternative embodiment of the invention lies primarily in the fact that said torque detector is placed as close as possible to the application of efforts and if possible beyond the main inertia forces and play. The device has the main effect of providing a very high quality of correction for dry friction forces since it is no longer a matter of corrections but of real measurements of the applied torque.

What we claim is:

1. A device which serves to control a mechanical assembly of the so-called "slave" type in displacements and in efforts and is actuated by a motor element, wherein said mechanical assembly is reversible and comprises a position detector for delivering a signal which is proportional to the displacements of said assembly and wherein said device comprises an assembly for controlling said motor element and delivering a signal constituting orders relating to the positions of said motor element, means for producing an error signal $\epsilon$ which is proportional to the difference between the signal delivered by the detector and the signal delivered by said control assembly, a generator for delivering a physical signal which produces action directly on the torque of the motor element, the amplitude of said signal being proportional to the signal $\epsilon$, the relation between the error signal and the torque being thus in one-to-one correspondence, the error signal being also fed back into said control assembly, said control assembly being constituted by a second mechanical assembly actuated by a second motor element comprising a second position detector, and wherein each motor element is controlled independently by a control loop circuit, each loop circuit being provided with means for generating an error signal $\epsilon$ which is proportional to the difference between the signals emitted by said detectors, means for providing a derivative of said error signal $\epsilon$ so as to give a signal $\epsilon'$ which is proportional to said derivative, means for determining the difference between the signals $\epsilon$ and $\epsilon'$ so as to give the signal E, and a second correspondence control stage constituted by a generator for delivering a physical signal which produces action directly on the torque of the motor element, the amplitude of said signal being proportional to the signal E, the relation between the error signal and the torque being thus in one-to-one correspondence.

2. A device according to claim 1, wherein at least one loop circuit comprises means for deriving the signal delivered by the detector, of the loop circuit considered and for adding said derived signal to the signal E at the input of said generator.

3. A device according to claim 1, wherein at least one control loop circuit comprises means for reducing the second derivative of the signal emitted by the detector which is associated with said loop and for adding said derivative to the signal which already drives the generator.

4. A device according to claim 1, wherein at least one loop circuit comprises means for deriving the signal emitted by the detector which is associated with said loop circuit, means for comparing said derived signal with a threshold value, means for producing a constant control signal and adding said signal to the signal which already drives said generator if said threshold value is attained, said control signal being such as to correspond to the starting torque of the motor elements.

5. A device according to claim 1, wherein each loop circuit includes a torque transducer for emitting a signal which is proportional to the torque really applied to said module and means for deducting said signal from the control signal to said generator.

6. A device according to claim 1, wherein the motor elements are torque motors, wherein the position detectors deliver electrical voltages and wherein the generator which constitutes the second correspondence control stage is an electric current generator.

7. A device according to claim 1, wherein the gains of the two control loop circuits are the same.

8. A device according to claim 1, wherein the gains of the two control loop circuits are different.

9. A device according to claim 5, wherein at least one loop circuit comprises means for deriving the signal delivered by the detector of the loop circuit considered and for adding said derived signal to the signal E at the input of said generator.

10. A device according to claim 5, wherein at least one control loop circuit comprises means for reducing the second derivative of the signal emitted by the detector which is associated with said loop and for adding said derivative to the signal which already drives the generator.

11. A device according to claim 5, wherein at least one loop circuit comprises means for deriving the signal emitted by the detector which is associated with said loop circuit, means for comparing said derived signal with a threshold value, means for producing a constant control signal and adding said signal to the signal which already drives said generator if said threshold value is attained, said control signal being such as to correspond to the starting torque of the motor elements.

12. A device according to claim 5, wherein the motor elements are torque motors, wherein the position detectors deliver electrical voltages and wherein the generator which constitutes the second correspondence control stage is an electric current generator.

* * * * *

UNITED STATES PATENT AND TRADEMARK OFFICE
CERTIFICATE OF CORRECTION

PATENT NO. : 4,056,763
DATED : November 1, 1977
INVENTOR(S) : Guy Debrie, Claude Grenier, Michel Petit, Henri Rigaut and Jean Vertut It is certified that error appears in the above-identified patent and that said Letters Patent are hereby corrected as shown below:

Column 1, line 60, please delete "dataprocessing" and insert --data processing--.

Column 3, line 52, please delete "masterto-slave" and insert --master-to-slave--.

Column 10, line 34, please delete "to" and insert --of--.

Signed and Sealed this

Fourteenth Day of February 1978

[SEAL]

Attest:

RUTH C. MASON
Attesting Officer

LUTRELLE F. PARKER
Acting Commissioner of Patents and Trademarks